United States Patent
Le et al.

(10) Patent No.: US 11,770,723 B2
(45) Date of Patent: Sep. 26, 2023

(54) SENSOR-ASSISTED TECHNIQUE FOR RF POWER NORMALIZATION IN LOCATIONING APPLICATIONS

(71) Applicant: ZEBRA TECHNOLOGIES CORPORATION, Lincolnshire, IL (US)

(72) Inventors: Vinh-Phuong T. Le, Fremont, CA (US); Thomas E. Warner, Moraga, CA (US); Edward W. Geiger, San Martin, CA (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/095,832

(22) Filed: Jan. 11, 2023

(65) Prior Publication Data
US 2023/0171616 A1  Jun. 1, 2023

Related U.S. Application Data

(62) Division of application No. 16/669,024, filed on Oct. 30, 2019, now Pat. No. 11,582,621.

(51) Int. Cl.
| | |
|---|---|
| *H04B 1/16* | (2006.01) |
| *H04W 24/02* | (2009.01) |
| *H04W 4/02* | (2018.01) |
| *H04R 3/12* | (2006.01) |
| *H04W 76/10* | (2018.01) |
| *H04W 64/00* | (2009.01) |
| *H04B 17/318* | (2015.01) |

(52) U.S. Cl.
CPC .............. *H04W 24/02* (2013.01); *H04B 1/16* (2013.01); *H04B 17/318* (2015.01); *H04W 64/006* (2013.01)

(58) Field of Classification Search
None
See application file for complete search history.

(56) References Cited

U.S. PATENT DOCUMENTS

| | | | |
|---|---|---|---|
| 2012/0088537 A1* | 4/2012 | Petersson ............. | H04B 7/0632 455/522 |
| 2016/0173177 A1* | 6/2016 | Zhu ......................... | H04W 4/70 370/329 |
| 2017/0108579 A1* | 4/2017 | Irvine ...................... | G01S 5/08 |
| 2017/0150371 A1* | 5/2017 | Cichonski ............. | H04W 64/00 |
| 2018/0279253 A1* | 9/2018 | Knoblauch ........... | H04W 64/00 |

(Continued)

*Primary Examiner* — Pablo N Tran

(57) ABSTRACT

A system for determining a distance between a receiver and a transmitter are disclosed herein. The transmitter includes a first antenna array having a first spatial orientation and is configured to transmit a signal. The receiver includes a second antenna array and an orientation sensor to determine a second spatial orientation of the second antenna array and is configured to receive the signal. A logic circuit is configured compare the first spatial orientation to the second spatial orientation to determine a relative orientation of the second antenna array; determine an angle of arrival of the signal; identify, based on the relative orientation of the second antenna array and the angle of arrival of the signal, a received signal strength compensation value; and calculate a distance between the transmitter and the receiver based on a measured received signal strength of the signal and the identified compensation value.

7 Claims, 7 Drawing Sheets

(56) References Cited

U.S. PATENT DOCUMENTS

2019/0043328 A1* 2/2019 Thomas ............. G08B 13/2402
2020/0007988 A1* 1/2020 Raj ...................... H04W 4/023
2020/0049509 A1* 2/2020 Hill .................... G06Q 30/0259

* cited by examiner

SENSOR-ASSISTED TECHNIQUE FOR RF POWER NORMALIZATION IN LOCATIONING APPLICATIONS

RELATED APPLICATIONS

This application is a continuation of U.S. patent application Ser. No. 16/669,024, filed on Oct. 30, 2019, the contents of which are incorporated herein by reference in their entirety.

BACKGROUND

Radio frequency (RF) transceiver technology is used in many location awareness applications. Example applications include indoor location tracking applications in which tracked assets are attached with long battery life RF transmitting "beacons" From these beacons, asset position can be tracked through a process generally termed "locationing." In healthcare applications, these beacons may be used to track medical equipment, personnel, and drugs, moving within a facility. In transportation applications, these beacons may be used to track movement and location of vehicles entering and exiting a facility. In manufacturing and warehouse management applications, beacons may be attached to assets for inventory tracking, beacons may be attached to shelving and walls for locationing, and beacons may be combined with location bridges, such as Internet-of-Things (IoT) bridges, to allow for real-time data tracking and analyses for generating actionable business insights. In retail environments, beacons may be used to track items from shelving through point of sale locations, for theft prevention.

These and other radio-based location awareness applications may rely upon any number of communication protocols, such as the many variants of IEEE 802.11 (Wi-Fi), MU-MIMO, Wireless ax, Wireless ad, Message Queue Telemetry Transport (MQTT), ZigBEE® ZWave®, Thread®, Near Field Communication (NFC), Bluetooth® (BT), and Bluetooth® Low Energy (BLE), for tracking and locationing of assets.

In many of these applications, a parameter termed the received signal strength indicator (RSSI) is used in determining the location of an asset, or more specifically, the location and/or proximity of an asset, as measured from a transmitter or a beacon. In a conventional Bluetooth application, for example, a transmitter sends a signal to a receiver over a wireless link, that signal may include an RSSI_at_1m value, also termed a measured power, that is specific to the Bluetooth transmitter. The receiver measures the RSSI for a received signal, captures the RSSI_at_1m value in the received data stream, and determines a proximity of the receiver to the transmitter. In examples, where multiple signals are received from multiple Bluetooth transmitters, the receiver may determine an actual location, for example, using geometrical triangulation techniques.

Unfortunately, there is no standard RSSI measurement. The broadcast signal strength can vary greatly from transmitter to transmitter. The RSSI at the receiver can fluctuate wildly depending on external factors influencing radio waves, such as, absorption, interference, or diffraction. And, the further away a receiver is from a transmitter, the more unstable that RSSI becomes.

Accordingly, there is a need to provide radio-based location awareness applications with a more accurate way of determining location and or position from RSSI.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
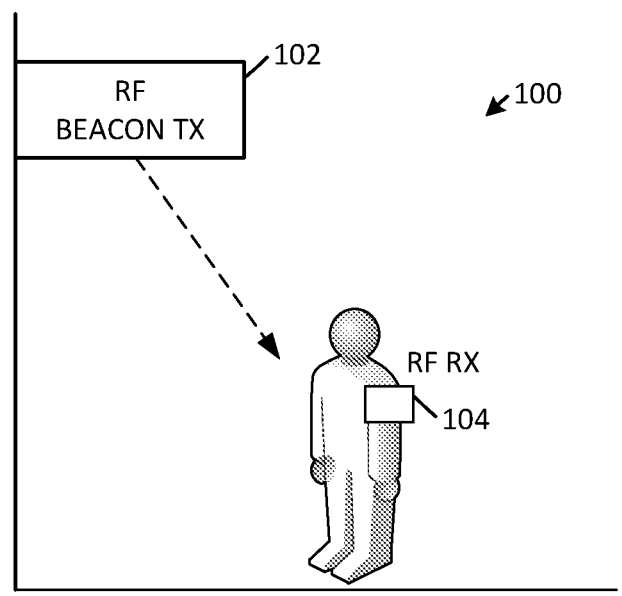
FIGS. 1A and 1B are side views of example RF locationing environments using a wall mounted RF beacon transmitter sending beacon signals to a wearable RF receiver (FIG. 1A) and to a RF receiver mounted to a shopping cart (FIG. 1B).

Connecting lines or connectors shown in the various figures presented are intended to represent example functional relationships and/or physical or logical couplings between the various elements. In general, the same reference numbers will be used throughout the drawing(s) and accompanying written description to refer to the same or like parts.

Elements in the figures are illustrated for simplicity and clarity and have not necessarily been drawn to scale. For example, components may be represented where appropriate by conventional symbols in the drawings, and may show only those specific details that are pertinent to understanding the embodiments of the invention so as not to obscure the disclosure with details that will be readily apparent to those of ordinary skill in the art having the benefit of the description herein. Further, the dimensions of some of the elements in the figures may be exaggerated relative to other elements to help to improve understanding of embodiments of the invention.

DETAILED DESCRIPTION

In various embodiments of the present disclosure, a receiver, a transmitter, a transceiver, a system, and related methods are configured to determine a distance between a receiver and a transmitter using received signal strength data and spatial orientation data.

In some examples, an RF receiver is configured to receive wireless communication signals from a transmitter, such as a beacon transmitter periodically sending a beacon signal. The receiver may include an antenna array that receives the beacon signal. The receiver further includes an orientation sensor for determining a spatial orientation of the antenna array. In some examples, the orientation sensor is a three-dimensional (3D) orientation sensor configured to determine a 3D spatial orientation of the antenna array. In some examples, the 3D orientation sensor is an accelerometer. In some examples, the 3D orientation sensor is carried by the same housing as the antenna array and, thus, the spatial orientation data provided by the accelerometer provides information regarding the spatial orientation of the antenna array. In some examples, the 3D orientation sensor is carried by a housing of the receiver and provides information regarding the spatial orientation of the receiver.

The RF receiver may include a logic circuit that determines an angle of arrival (AoA) for the received signal by analyzing signals received by the antenna array. For example, the logic circuit may determine the angle of arrival based on the distance between antenna elements of the array and phase differences between signals received at each antenna element. In some examples, the logic circuit may control the antenna array to perform beamforming to determine the angle of arrival.

The logic circuit of the RF receiver measures received signal strength of a signal transmitted by the RF transmitter. The logic circuit determines a distance between the receiver and the transmitter based on a measured received signal strength of the signal at the receiver, the determined angle of arrival of the signal, and the spatial orientation of the receiver or of the antenna array.

In some examples, the RF receiver may include a memory that stores an orientation compensation profile comprising compensation values. e.g., in a data table or matrix format. Compensation values may be stored for different spatial orientation values of the receiver, for different spatial orientation values for an RF transmitter, and for different angles of arrival between the receiver and the RF transmitter. The spatial orientation values may be determined relative to a reference orientation.

The logic circuit is configured to generate, from these compensation values, a compensated received signal strength, from which the receiver can determine a distance between the receiver and the transmitter in some examples, a logic circuit identifies (from the orientation compensation profile) the compensation value that corresponds to the spatial orientation of receiver and the angle of arrival of the received signal. The logic circuit applies that identified compensation value to the measured received signal strength to generate a compensated received signal strength for the receiver. The process of applying the identified compensation value to the measured received signal strength is termed weighting herein and may include an additive combining of the two values, a factoring of the two values, or some other combination technique. In any event, in some examples, the logic circuit weights the measured received signal strength based on the identified compensation value. In some examples, an orientation compensation profile is stored in a memory of the receiver as a lookup table, and the compensation values are orientation-dependent and angle of arrival-dependent values stored in that lookup table.

In some examples, the orientation compensation profile is a data file containing an antenna pattern for the receiver, e.g., a table of antenna gains at all degrees of the antenna array for the receiver. In some examples, the orientation compensation profile further includes an antenna pattern for one or more different transmitters, e.g., a table of antenna gains at all degrees of the antenna array for each transmitter that may be sending a signal to the receiver.

In some examples, the RF transmitter is configured to send to the receiver a signal that includes the spatial orientation of the transmitter. In some such examples, the logic circuit of the receiver may then determine a distance between the receiver and the transmitter based on a measured received signal strength of the signal at the receiver, the angle of arrival of the signal at the receiver, the spatial orientation of the receiver, and the spatial orientation of the transmitter.

In some examples, a method includes receiving, via an antenna array, a signal transmitted by a transmitter and determining, using a sensor, a spatial orientation of the antenna array. The method further includes determining an angle of arrival of the signal and determining a distance between the antenna array and the transmitter based on a measured received signal strength of the signal, the angle of arrive, and the spatial orientation of the antenna array.

In some examples, a system includes a transmitter including a first antenna array having a first spatial orientation, where the transmitter transmits a signal, such as a periodic beacon. The system further includes a receiver including a second antenna array and an orientation sensor to determine a spatial orientation of the second antenna. The receiver receives the transmitter signal and determines a measured received signal strength for that signal. In some examples, the receiver includes a logic circuit configured to compare the first spatial orientation to the second spatial orientation to determine a relative orientation of the second antenna array of the receiver. In some examples, the logic circuit determines an angle of arrival of the signal. In some examples, the logic circuit identifies, based on this relative orientation of the second antenna array and the angle of arrival, a received signal strength compensation value y. The logic circuit calculates a distance between the transmitter and the receiver based on a received signal strength of the signal and the identified compensation value.

In some examples, both the transmitter and the receiver have dedicated orientation sensors, and the receiver receives orientation data from the transmitter and uses the transmitter orientation data and its own receiver orientation data to determine the relative orientation between the two. The transmitter or the receiver determines an angle of arrival for a signal between the transmitter and the receiver; and the relative orientation is used with the angle of arrival to determine a distance between the transmitter and the receiver.

In some examples, a logic circuit external to both the receiver and the transmitter is used to determine one or more of the relative orientations, a compensated received signal strength, an angle of arrival, an identified compensation value, and/or a distance between transmitter and receiver. The logic circuit receives data from one or both of the transmitter and the receiver over a wired or wireless communication link, such as over a Wi-Fi, NFC, BT, or BLE communication link.

While in examples herein RF devices are separately described as receivers, transmitters, and transceivers, it will be understood that any of these devices may represent any others of these devices. For example, while an example described herein may refer to a device as a transmitter, that device may also receive signals (i.e., function as a transceiver). Alternatively, while an example described herein may refer to a device as a receiver, that device may also transmit signals (i.e., function as a transceiver). Furthermore, functionality described as occurring in any of these devices may instead be achieved in any other of these devices.

The devices, systems, and methods disclosed herein may be used in location awareness environments, such as healthcare facilities, warehouse facilities, transportation facilities, etc., where tracking assets is desired, in particular for determining the proximity (and, in some instances, the location) of assets within an environment. Techniques disclosed herein allow for such determinations based on a received signal metric, such as the Received Signal Strength Indicator (RSSI) or Received Channel Power Indicator (RCPI), where the spatial orientation of one or more RF antenna array involved in the locationing functionality is used to improve the location calculations that are based on such signal metrics. As such, devices employing techniques disclosed herein can compensate for (i.e., account for) directional (also termed orientation variance inherent in an antenna beam patterns associated with mobile antennas implemented in mobile (i.e., movable as an intended use) devices.

The RSSI is the relative received signal strength in a wireless environment, measured in arbitrary units. The measured RSSI may differ from vendor to vendor and, thus, may differ from receiver to receiver. The techniques herein may be implemented in any suitable wireless communication protocol, such as for example, IEEE 802.11n, (Wi-Fi), MU-MIMO (wireless 5). Wireless ax (wireless 6), THREAD® protocol, ZIGBEE®, ZIGBEE Pro®, ZWave®, ZWave Plus®, Message Queue Telemetry Transport (MQTT), Near Field Communication (NFC), Bluetooth® (BT), or Bluetooth Low Energy (BLE). In 802.11n environments, for example, a receiver may determine RSSI by sampling the preamble frame of the received data.

RSSI is an example signal strength metric. Other signal strength metrics may be used with the techniques disclosed herein. For example, the received channel power indicator (RCPI) is a signal strength metric associated with 802.11 protocols, and is a measure of the received radio frequency power which is defined as the sum of the received signal power, the noise power, and the interference power in a selected channel at the receive antenna connection. The RCPI is measured in dBm. In some implementations, RCPI offers higher levels of accuracy and resolution compared to other signal metrics.

In any event, while specific examples are described herein in reference to RSSI, RCPI or any other suitable signal strength metric may be used as a substitute for RSSI or in combination therewith.

Figure 1B:
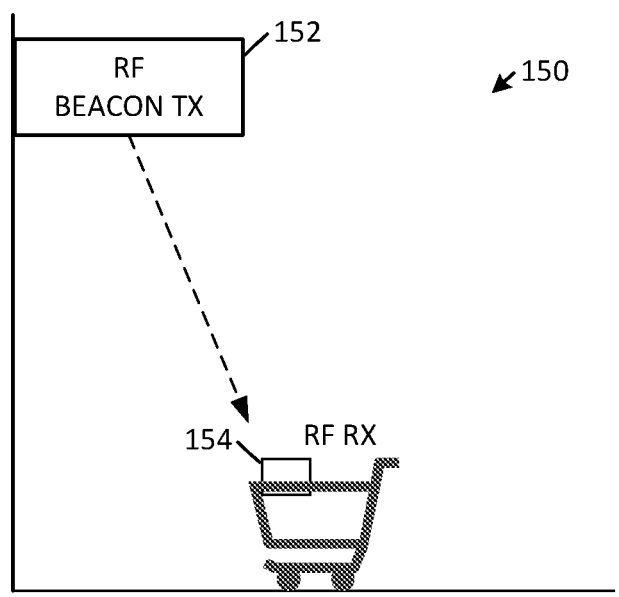

FIGS. 1A and 1B illustrate first and second example location awareness environments 100 and 150, respectively. The first environment 100 represents a hospital, for example. The second environment 150 represents a retail store, for example.

In the first environment 100, a RF beacon transmitter 102 is mounted to a wall (e.g., at a patient room) and configured to periodically (e.g., twice per second or once per minute) transmit a beacon signal that is receivable by any RF suitable receiver in the environment 100, including a first receiver 104 of FIG. 1A. In the illustrated example, the first receiver 104 is attached to an asset (such as a healthcare professional, medical equipment, medication packaging, etc.) that moves within a store environment. In the second environment 150 of FIG. 1B, a RF beacon transmitter 152 is mounted to a wall or shelf (e.g., throughout the environment, at a point of sale, at an exit of the retail environment, etc.) and configured to periodically transmit a beacon signal received by a second RF receiver 154, which may be attached to an asset such as a shopping cart. While not shown, in many examples, the first and second environments 100 and 150 have additional beacon transmitters mounted throughout. In some examples, the first and second environments 100 and 150 have additional receivers that receive beacon signals from these transmitters.

While examples are described with wall-mounted RF beacon transmitters 102 and movable RF receivers 104, in other examples, the RF receivers discussed herein may be stationary mounted, for example, mounted to a wall, shelf, ceiling, or other structure, and the beacon transmitters may mounted to assets and move throughout the environments. In yet some examples, both the RF beacon transmitters and the RF receivers may move relative to an external reference point in an environment.

The beacon transmitters 102/152 and the receivers 104/154 may be configured according to any number of wireless communication protocols, including the various versions of Wi-Fi, Thread, ZigBEE, ZWave, MQTT, NFC, BT, or BLE. In some examples, the beacon transmitters and receivers described in the various examples herein are BT or BLE devices.

In operation, as each of the receivers 104/154 moves relative to the beacon transmitters 102/152, the distances between the two may change. Moreover, the relative spatial orientation changes between the two. In particular, the spatial orientation of the antenna arrays of the receivers and/or transmitters herein may change, as one or both of the devices move.

Figure 2:
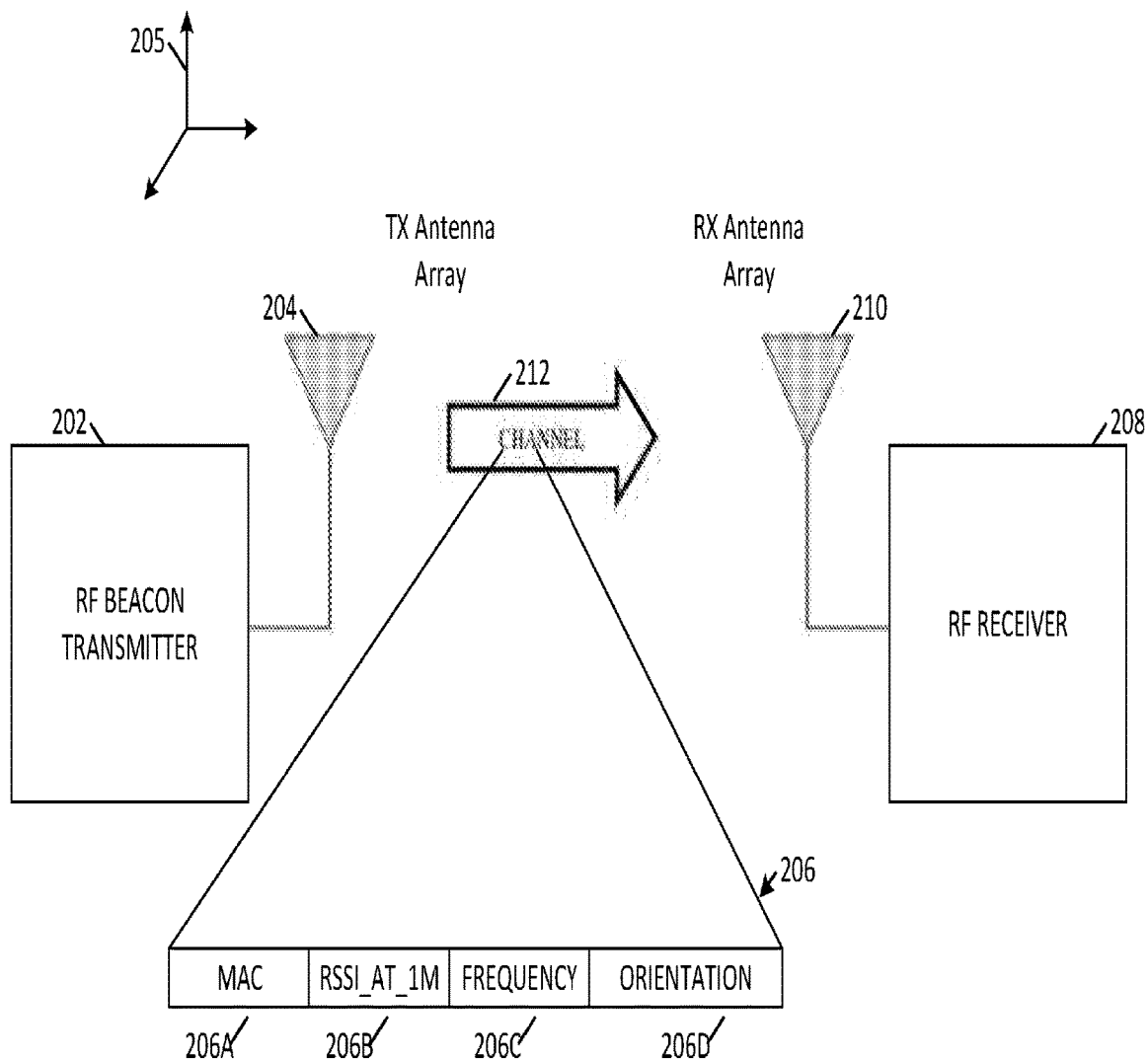
FIG. 2 is a block diagram of a RF beacon transmitter transmitting (to a RF receiver) a data packet including channel information containing RSSI data, frequency information, and/or antenna orientation information, in accordance with teachings of this disclosure.

FIG. 2 illustrates a beacon transmitter 202 with an antenna array 204 transmitting, over a channel 212, a data packet 206 to a receiver 208 having an antenna array 210. Assuming, for example, that the beacon transmitter 202 is spatially fixed (e.g., rigidly mounted to a wall), then as the receiver 208 moves, the orientation of its antenna array 210 moves relative to the antenna array 204 of the beacon transmitter 202.

In the illustrated example, the data packet 206 contains a media access control (MAC) address 206A, identifying the beacon transmitter, reference signal strength information such as RSSI information including a value for RSSI at one meter 206B. In the illustrated example, the RSSI at one meter 206B is laboratory determined and transmitter dependent. The receiver 208 receives the data packet 206, measures the RSSI for the received signal, strips the RSSI_at_1M value 206B, and uses that that to determines a distance between the receiver 208 and the transmitter 202. The data packet 206 may further include frequency information 206C and orientation information 206D, which indicates the spatial orientation of the antenna array 204 relative to a reference axis 205 (e.g., true vertical). In some examples, the MAC address 206A is used to identified both the beacon transmitter and the beacon transmitter type, e.g., what type of antenna is configured into the beacon transmitter. In some examples, an antenna type data field, ANT TYPE 206E may be transmitted in the data packet 206.

The antennas arrays 204 and 210 can be linear, planar, or omnidirectional, by way of example. The antennas arrays 204 and 210 may use near field effects such as inductive coupling for activation. The antennas arrays 204 and 210 may be printed, etched or stamped with conductive ink or even vapor deposited onto, for example, a substrate.

Figure 3:
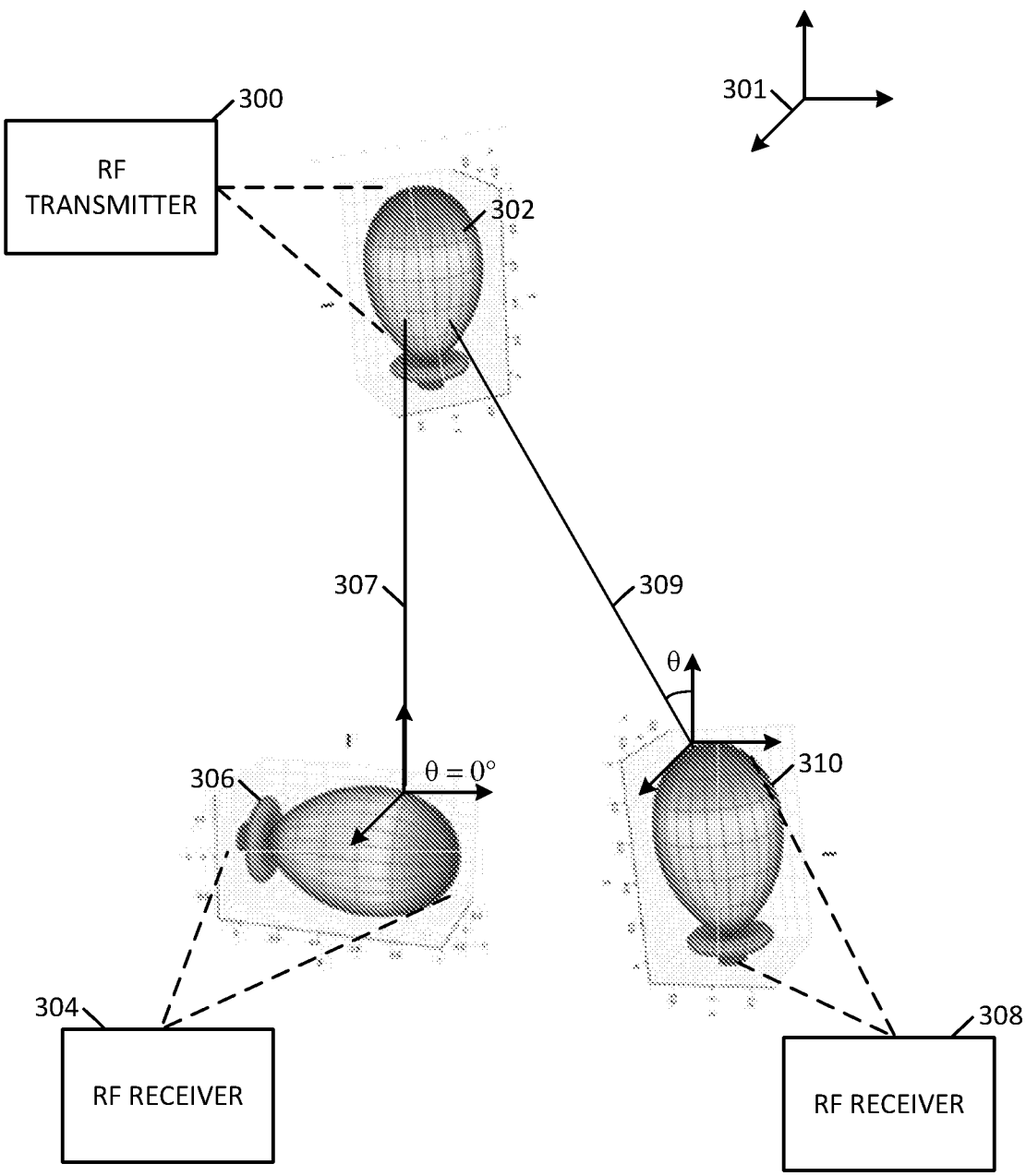
FIG. 3 is an illustration of a RF transmitter having a fixed spatial orientation communicating with different RF receivers having different spatial orientations and different positions.

FIG. 3 illustrates a RF transmitter 300 in a fixed position and having an antenna array with an antenna pattern 302 with a particular spatial orientation relative to a reference coordinate system 301. A first RF receiver 304, having an antenna array with an antenna pattern 306, receives a signal from the transmitter 300 along a direct signal path 307. A second RF receiver 308, having an antenna array with an antenna pattern 310, receives a signal from the transmitter 300 along a direct signal path 309. As shown, each signal path 307 and 309 is different. Importantly, each signal path 307 and 309 coincides with different portions of the antenna patterns for the transmitter 300 and respective receivers. Even for two receivers with the same antenna pattern, differences in orientation and differences in position relative to the transmitter 300 result in different antenna gains, both at that transmit side and at the receiver side. These differences are reflected in the angles of arrival of the different signal paths 307 and 309, as well as the antenna patterns of the RF devices, and these differences will result in the receivers 304 and 308, measuring different received signal strengths, which result in inaccurate determinations of distances between RF devices. In the illustrated example, each of the paths 307 and 309 have different angles of arrival, as measured against the reference coordinate system 301. θ°

Figure 4:
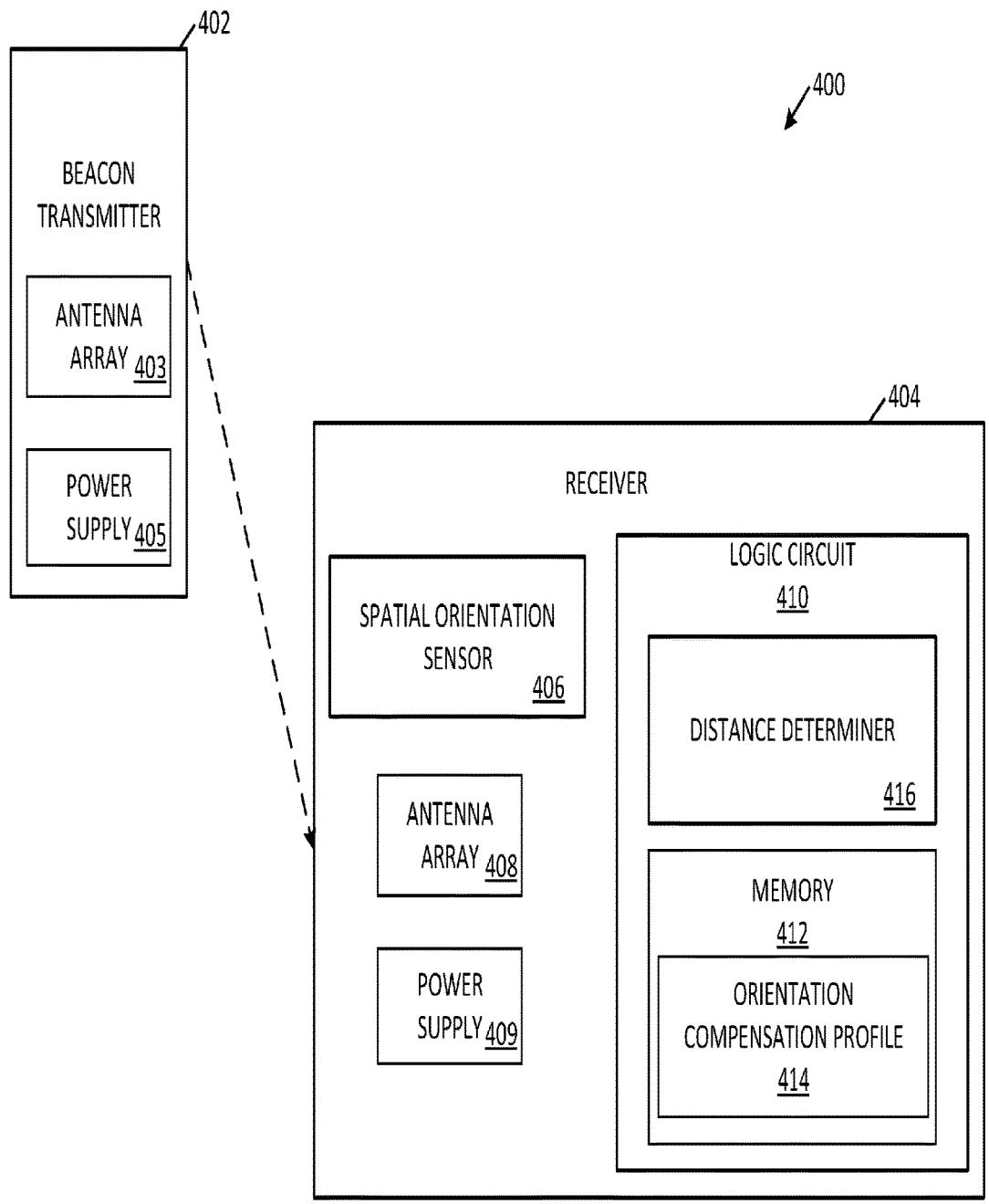
FIG. 4 is a block diagram illustrating an example RF locationing environment having a RF beacon transmitter and a RF receiver having a three-dimensional (3D) orientation sensor and a logic circuit for determining an angle of received signal arrival and a distance between the RF receiver and the RF beacon transmitter based on a received signal strength, the 3D orientation sensor, and the angle of arrival, in accordance with teachings of this disclosure.

FIG. 4 illustrates an example locationing system 400 constructed according to teachings of this disclosure to recognize the source of potential errors (i.e., the difference between antenna orientations and the corresponding effects on RSSI values) and to compensate for the same. The example locationing system 400 of FIG. 4 includes a RF beacon transmitter 402 and a RF receiver 404. In the example of FIG. 4, the RF receiver 404 is configured to determine a distance between the receiver 404 and the beacon transmitter 402 based on a measured received signal strength metric, angle of signal arrival, and the determined spatial orientation of the receiver 404 relative to the spatial orientation of the beacon transmitter. In the example, the RF beacon transmitter 402 is mounted in a fixed position within an environment, and the RF receiver 404 is attached to a mobile asset and, thus, able to move within that environment. In some examples, the RF beacon transmitter 402 represents a transmitter stage of a first transceiver, and the RF receiver 404 represents the receiver stage of a second transceiver, and one or both of the transceivers may be movable within an environment.

The transmitter 402 includes an antenna 403 and a power supply 405. The antenna 403 may be a single element antenna. In some examples, the antenna 403 may be a single antenna selected from an array of antenna elements to transmit a beacon signal. In some examples, the antenna 403 may be replaced with an antenna array of multiple antenna elements that are used to transmit a beacon signal, for example, using beamsteering.

The receiver 404 includes a spatial orientation sensor 406, which may be a 3D orientation sensor such as an accelerometer. The receiver 404 includes antenna array 408, power supply 409, and a logic circuit 410, such as a logic circuit, configured to determine a distance of the receiver 404 to the transmitter 402. The logic circuit includes memory 412 that contains, among other data, an orientation compensation profile 414. In the example of FIG. 4, the orientation compensation profile is a data file containing antenna patterns for the receiver and one or more transmitters (such as patterns 302 and 306/310), angles of arrival, and RSSI compensation values.

As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations of FIGS. 1-7). Some example logic circuits are hardware that executes machine-readable instructions to perform operations (e.g., one or more of the operations of FIGS. 1-7). Some example logic circuits include a combination of specifically configured hardware and hardware that executes machine-readable instructions.

In operation, as the beacon transmitter 402 transmits a beacon signal including the data packet 206 of FIG. 2 to the receiver 404 and a distance determiner 416 determines a distance between the receiver 404 and the transmitter 402 using a received signal strength (e.g., RSSI, RCPI, etc.) measured by the logic circuit 410, information sent in the data packet 206 regarding the spatial orientation of an antenna of the beacon transmitter 402, data from the spatial orientation sensor 406, an angle of arrival (AoA) of the signals from the beacon transmitter 402 as measured by the logic circuit 410, and the orientation compensation profile 414. In particular, the distance determiner 416 is configured to determine (along with measured RSSI and angle of arrival) a spatial orientation of the antenna array 408 relative to the beacon transmitter 402, identify a compensation value corresponding to the determined relative spatial orientation of the antenna array 408 and the determined angle of arrival in the orientation compensation profile 414, and apply that compensation value to a distance calculation, for example by weighting based on the measured received signal strength metric (e.g., RSSI) used to determine distance.

In an example, the orientation compensation profile 414 stores compensation values for each relative orientation between the transmitter antenna pattern 302 and the receiver antenna pattern. i.e., for each possible direct signal path between the two RF devices. The compensation values stored for each of these combinations may be determined during manufacture or initial device set up. The compensation values are used by the logic circuit (e.g., the logic circuit 410 of FIG. 4) to determine a compensated received signal strength and to determine a more accurate distance measure. These compensation values, for example, may be values measured by an RF engineer in a testing environment and determined for each of the different device orientation and antenna polarization permutations shown.

Figure 5:
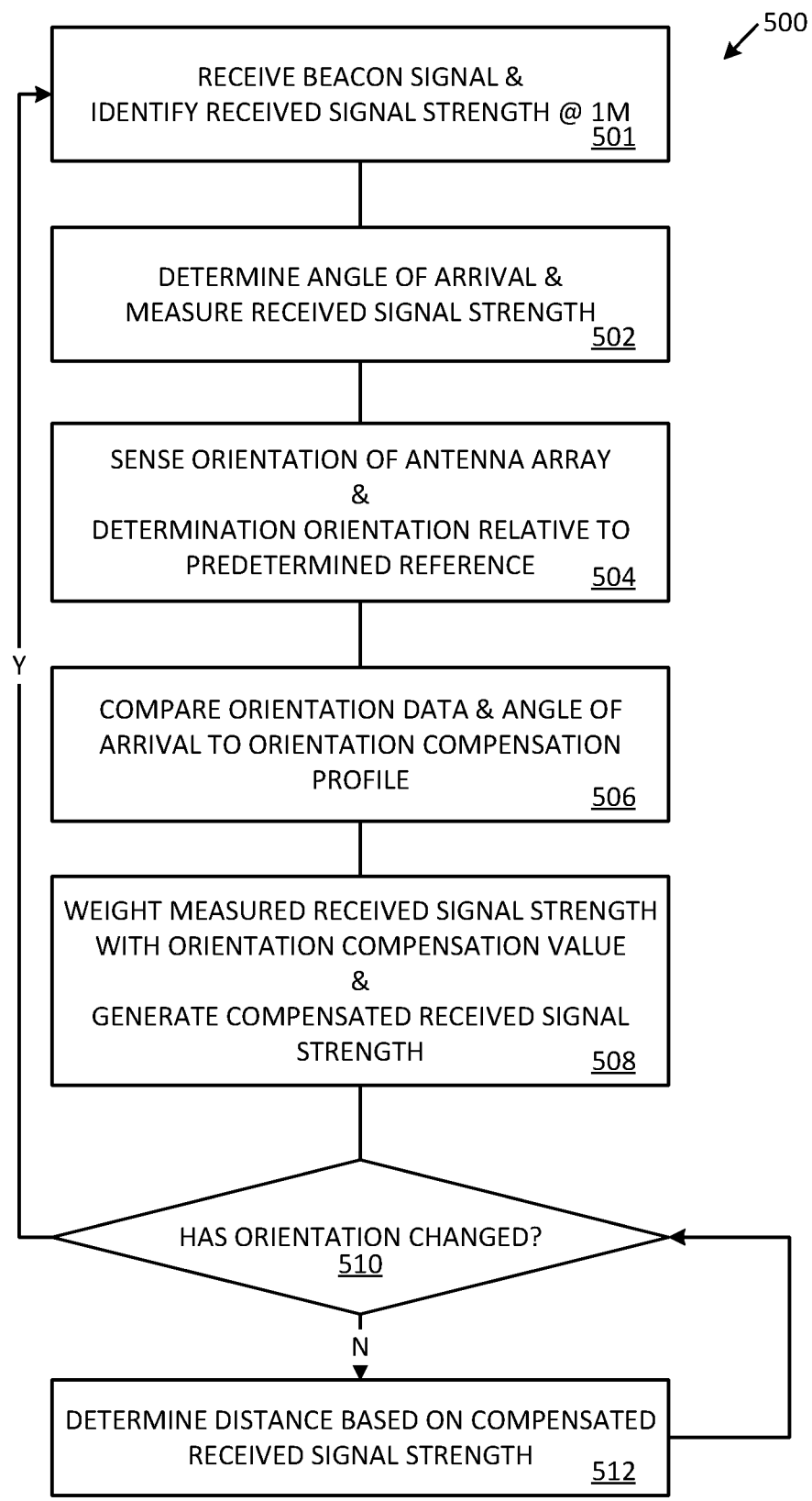
FIG. 5 is a flow chart of an example method of determining a distance between an RF receiver and an RF transmitter based on a received signal strength of a signal, an angle of received signal arrival, and a spatial orientation of the RF receiver, in accordance with teachings of this disclosure.

In FIG. 5, a process 500 demonstrates an example method of determining a distance between an RF receiver and an RF transmitter based on a received signal strength of a signal and device spatial orientation, as may be executed by the example receiver 404 of FIG. 4. In this example, the method is performed by the logic circuit in the receiver. In other examples, method may be performed by a transmitter or externally coupled computing device, such as a wirelessly connected server.

A beacon signal is received (501) by the receiver which strips a received signal strength @ 1M value from the signal. The receiver (502) determines an angle of arrival of the beacon signal and measures a received signal strength metric (measured RSSI). The angle of arrival may be determined from the antenna array 408, based on the distance between antenna elements and the phases between signals captured at each element. In response to receiving the beacon signal, the receiver communicates with a spatial orientation sensor deployed in the receiver to obtain information regarding the spatial orientation of the antenna array (504). A determination of the orientation of the antenna array relative to a predetermined reference axis (e.g., axis 301) is also obtained (504). In some examples, the orientation is determined by the spatial orientation sensor itself, while in other examples the logic circuit may determine the orientation based on the sensed data from that sensor. In any event, the orientation data and angle of arrival is compared (506) against an orientation compensation profile to determine if an adjustment to the measured received signal strength from block (502) should be performed. If the comparison identifies a compensation value, then the measured received signal strength is weighted with that compensation value to generate a compensated received signal strength (508). For example, the direct signal path 307 for the receiver 304 coincides with different gain points of the antenna patterns 302 and 306, than that of the direct signal path 309 of the receiver 308. The receiver 304 will not only measure a different received signal strength based on the physical distance between it and the transmitter 300, that measured signal strength results from different orientations of its antenna pattern 306 and a different angle of arrival, in comparison to the receiver 308. Each receiver then would identify a compensation value used for weighting the respective measured signal strength. In some examples, the measured signal strength is expressed in dBms and the compensation values are also expressed in dBms.

After the compensated received signal strength is generated, the process 500 may optionally determine if the orientation of the receiver has changed (510) and start the process again. In some examples, the process 510 may be bypassed or it may be executed later. In any case, if the orientation has not changed or if the process 510 is executed later, a process 512 determines a distance between the receiver and the transmitter based on the compensated received signal strength. For example, the receiver may determine the distance using the following formula for Free-Space path loss:

$$FSL = 20\log_{10}(d) + 20\log_{10}(f) + 20\log_{10}\left(\frac{4\pi}{c}\right) - G_{TX} - G_{RX}$$

Where
FSL=free-space path loss
d=distance between transmit and receive antennas (meters)
f=signal frequency (hertz)
c=speed of light=$3 \times 10^8$ m/s
$G_{TX}$=gain of the transmitting antenna
$G_{RX}$=gain of the receiving antenna The process 512 may be implemented in different ways depending on the receiver and beacon transmitter. For example, in some examples, the receiver may receive from the beacon transmitter data including, RSSI @1M, frequency information, orientation information on the transmitter antenna, and transmitter antenna type information. The receiver may send this received information, along with the measured RSSI, angle of arrival, and the receiver antenna array orientation, to a remote server (in the build or in the cloud) which will determine the compensated RSSI. For example, the remote server may determine the transmitter antenna gain and receiver antenna arras gain at the intersection of both of their antenna patterns (see. e.g., FIGS. 3A-3C).

Take for example, a scenario in which both the transmitter antenna and the receiver antenna array are pointing at one another. The remote server may determine the transmitter power from which it determines the distance. For example, in a scenario, the transmitter antenna gain at 0.0.0 degrees is 0 dBi for a particular antenna type, which may be identified by the ANT type field 206E. Other antenna types may have a gain at 0.0.0 degrees of −2, +3, −8, and so on. The transmitter RSSI@1M is −50 dBm, which may be identified by the data field 206B. The receiver antenna gain is −5 dBi based on the type of receiver antenna, and for a given angle, such as 0.0.0. degrees, and assuming that there is Free Space path lost. Therefore, for a measured RSSI at the receiver of −60 dBm, the remote server may first calculate the transmitter power, using: (transmitter power)+(transmitter antenna gain)+(receiver antenna gain)=(Free Space path loss)+K, where K is a correction factor based on the environment of use and may be determined during installation of the transmitter. Because the remote server knows that the RSSI@1M is −50 dBm and the transmitter antenna gain at 0.0.0 is 0 dBi, then, the transmitter gain is −10 dBm, assuming a Free Space path loss of 50 dB for 1 meter. From calculating the transmitter gain as −10 dB, with a transmitter antenna gain of 0 dB, and a receiver antenna gain of −5 dB, and a measured RSSI of −60 dB, the remote server using the above formula determines the distance between the receiver and the transmitter as 1.77 m. So by using these spatial orientation sensors and determining the angle of arrival, the remote server can adjust the transmitter antenna gain and receive antenna gain to correct for the RSSI measured by the receiver.

Figure 6:
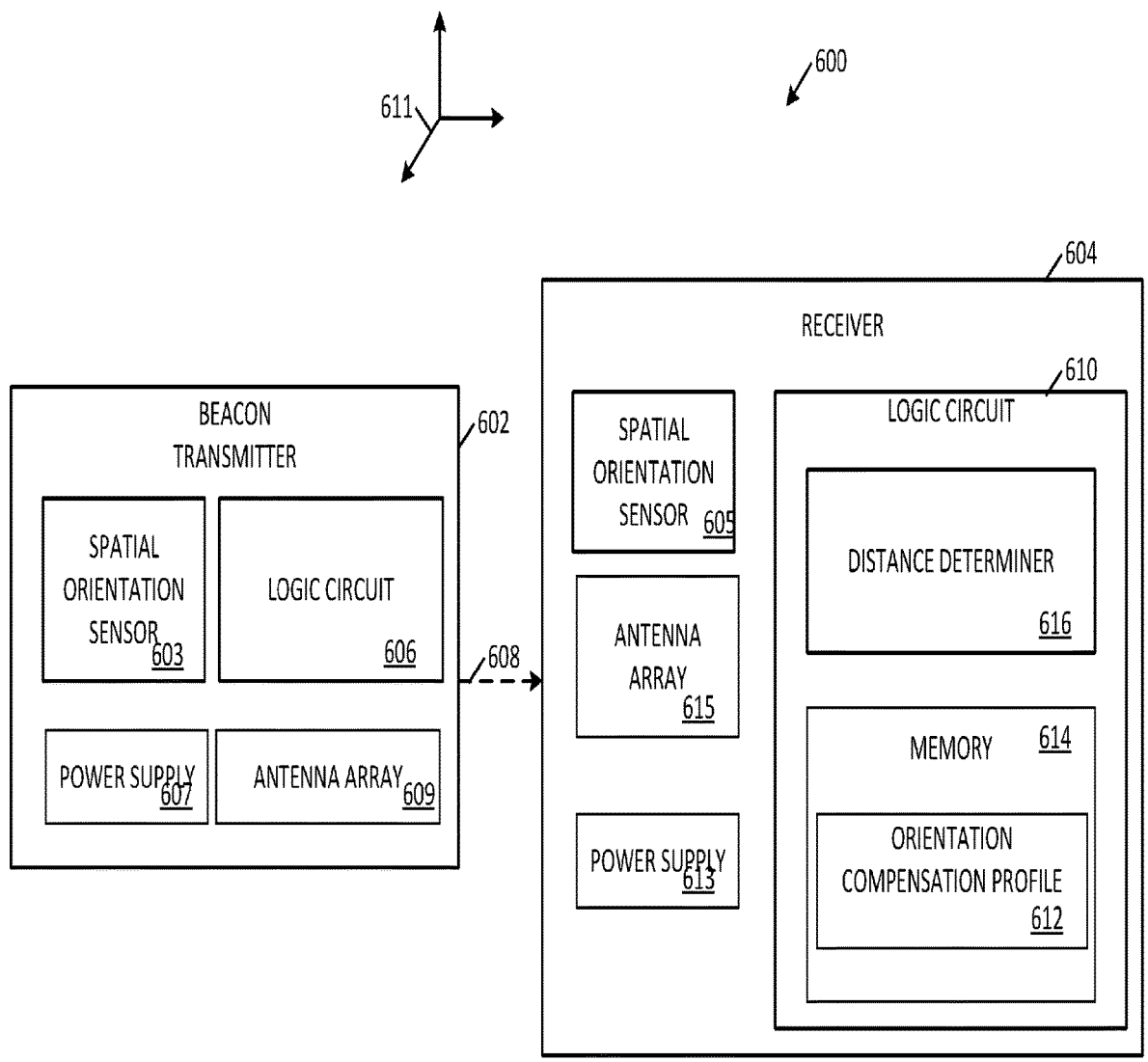
FIG. 6 is a block diagram illustrating an example RF locationing environment having a RF beacon transmitter and a RF transceiver that both include a 3D orientation sensor for sharing orientation data in the determination of a distance between the RF beacon transmitter and the RF transceiver, in accordance with teachings of this disclosure.

FIG. 6 illustrates an example locationing system 600 in which a beacon transmitter 602 and a receiver 604 both include an orientation sensor 603 and 605, respectively, like that of sensor 406. The beacon transmitter 702 includes a power supply 607, an antenna 609, and a logic circuit 606. Like the antenna 403 of FIG. 4, the antenna 609 may be a single antenna element or it may be an antenna array. The logic circuit 606 is configured to receive spatial orientation data from the spatial orientation sensor 603 determine a spatial orientation of the antenna 609 (e.g., relative to a reference axis 611), and generate data packets containing orientation data (e.g. like the data 206D in FIG. 2) identifying the antenna orientation of the transmitter. The data packets are communicated in a beacon signal broadcast over a wireless communication link 708. The receiver 704 includes the spatial orientation sensor 605, power supply 613, and antenna array 615. A logic circuit 610 includes an orientation compensation profile 612 stored in a memory 614.

The logic circuit 610 is similar to the logic circuit 416 but has been configured to receive orientation information from the spatial orientation sensor 605, obtain the transmitter orientation information from the received beacon signal, and determine a relative orientation between the transmitter 602 and the receiver 604. That is, the logic circuit 610 determines the orientation of the receiver 604, not relative to the reference axis 611, but rather relative to the orientation of the transmitter antenna 609, determined by the logic circuit 606.

In other examples, the spatial orientation sensors 603 and 605 may be pre-configured to determine their respective spatial orientation relative to a reference coordinate system, such as 611. That way, the logic circuit 610 can determine relative spatial orientation without first determining a universal reference coordinate system.

In other examples, in particular in examples where the devices 602 and 604 each represent transceivers able to communicate back and forth with one another, relative spatial orientation between devices may be determined without using a reference coordinate system.

In any event, the logic circuit 610, in particular a distance determiner 616, compares the relative spatial orientation between the receiver 604 and the transmitter 602 and an angle of arrival of a signal between the two, to the stored orientation compensation profile 612, to identify a compensation value that is then applied to a measured received strength signal value for determining a compensated received signal strength and determining a distance between the receiver 604 and the transmitter 602.

In the system 600, the transmitter 602 may be a stand-alone transmitter or it may be a transmitter stage of a first transceiver. Similarly, the receiver 604 may be a standalone receiver or it may be a receiver stage of a second transceiver. Further, the functionality of logic circuits 606 and 610 may be combined into logic circuits at each of the receiver 604 and the transmitter 602, allowing either logic circuit to perform the transmitter-side/receiver-side processes described herein. Thus, the communication link 608 may be a bi-directional communication.

Figure 7:
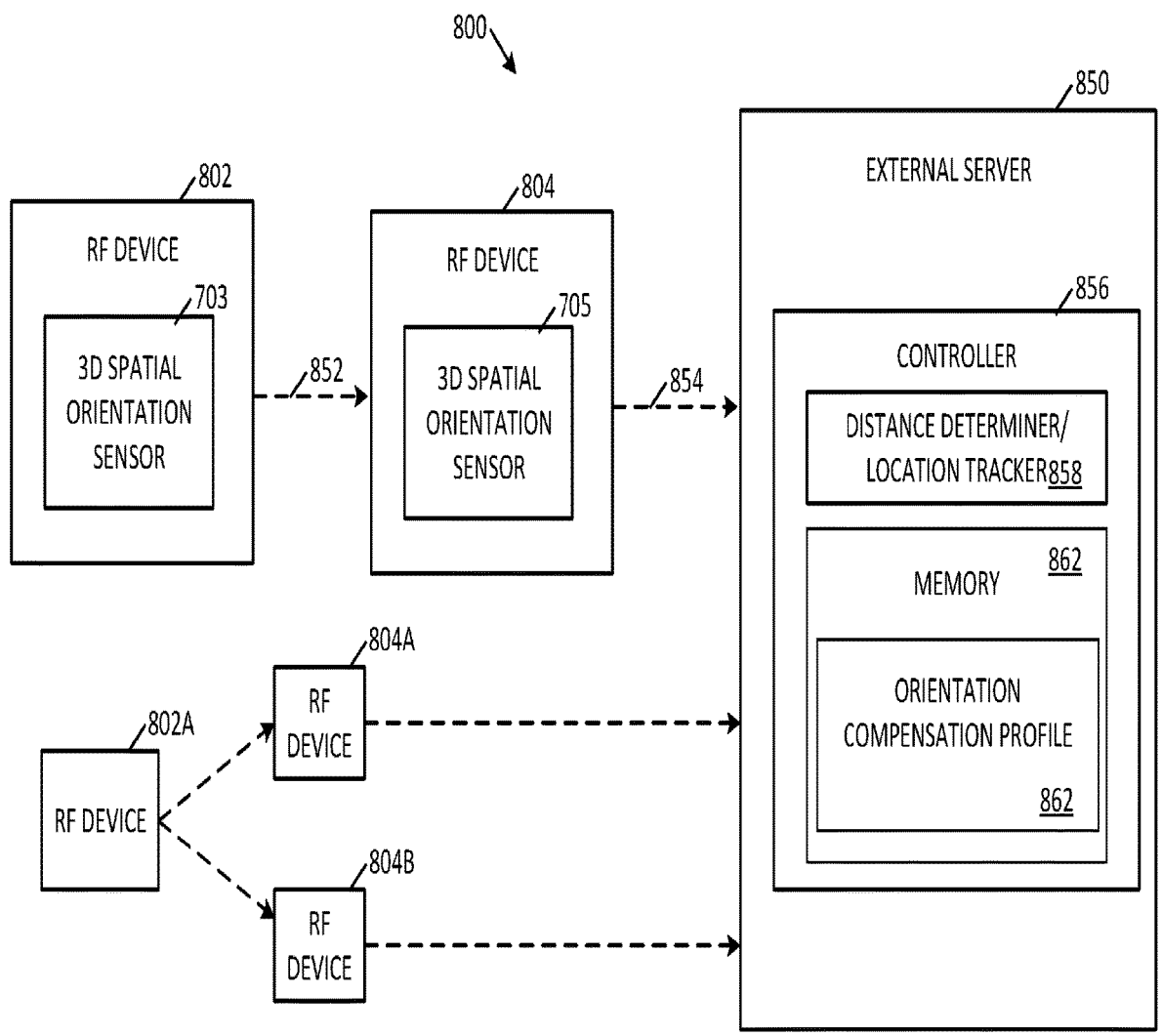
FIG. 7 is a block diagram illustrating an example RF locationing environment showing an external logic circuit for determining a distance between the RF beacon transmitter and the RF transceiver, in accordance with teachings of this disclosure.

In FIG. 7, another example system 800 includes a first RF device 802 and a second RF device 804, and further includes an external server 850 communicatively coupled to one or both devices.

In an example, the first RF device 802 may be a beacon transmitter and may be configured like the transmitters 402 or 602. In the illustrated example, the RF device 802 optionally includes a 3D orientation sensor 703 (the other components are not shown). In an example operation, using a first communication link 852, the device 802 determines its orientation and transmits an RF signal including its orientation information to the second RF device 804. The device 802 may transmit identification information in the RF signal, such as a MAC address and a received signal strength at 1M value.

The RF device 804 may be configured as receiver such as the receivers 404 and 604. In the illustrated example, the RF device 804 includes a 3D orientation sensor 705 (the other components are not shown). The RF device 804 determines its own orientation, e.g., based on its own predetermined reference or relative to the orientation of the RF device 802 determined from the received orientation information. The RF device 804 determines an angle of arrival of a signal. The RF device 804 measures a received signal strength. The RF device 804 then transmits its orientation information, the measured received signal strength information, angle of arrival, and identification information for the device 804 into an RF signal that is sent to the external server 850 over a second communication link 854. In the illustrated example, the RF device further packets the orientation information and identification information received from the RF device 802 into that RF signal sent over the link 854.

The external server 850 includes a logic circuit 856 configured to determine a distance between the RF device 804 and the RF device 802 in accordance with the techniques described herein. For example, the logic circuit 856 may include a distance determiner/location tracker 858 configured to receive orientation information for one or both of the RF devices 802 and 804, and compare that orientation information to an orientation compensation profile 862 stored in a memory 862. From that comparison, the distance determiner/location tracker 858 determine a compensation value for a received signal strength and determines a distance between the RF devices 802 and 804.

In some examples, the distance determiner/location tracker 858 is configured to continuously or periodically determine the distance of one or more of the RF devices 804, 804A, 804B, thereby tracking the distance as the devices move within an environment. In some examples, both RF devices 802 and 804 communication their respective orientation information to the external server 850 which determines the relative distance the devices.

In some examples, the external server 850 receives orientation information from a plurality of RF devices, for example a plurality of RF devices 804A. 804B (acting as receivers) each receiving a beacon signal from the RF device 802A (acting as a beacon transmitter). The external server 850 then determines and tracks the distance between each of the receivers and the beacon transmitter.

In yet other examples, multiple RF devices communicate their relative orientations to the external server 850 and the external server performs locationing to identify the location of one or more of these RF devices based on the compensated received signal strength values determined for each RF device. For example, by determining the distances of an RF device 804 relative to a plurality of different RF devices, such as a plurality of beacon transmitters 802A, the distance determiner/location tracker 858 can determine a location of the RF device 804 through a triangulation process or other process. In that way, by determining the optimized distances using the techniques herein, the external server 850 may additionally achieve a more accurate locationing of assets within an environment.

In the foregoing specification, specific embodiments have been described. However, one of ordinary skill in the art appreciates that various modifications and changes can be made in view of aspects of this disclosure without departing from the scope of the invention as set forth in the claims below. Accordingly, the specification and figures are to be regarded in an illustrative rather than a restrictive sense, and all such modifications made in view of aspects of this disclosure are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The term "coupled" as used herein is defined as connected, although not necessarily directly and not necessarily mechanically. A device or structure that is 'configured' in a certain way is configured in at least that way, but may also be configured in ways that are not listed.

Further, unless expressly stated to the contrary, "or" refers to an inclusive or and not to an exclusive or. For example, A, B or C refers to any combination or subset of A, B, C such as (1) A alone, (2) B alone, (3) C alone, (4) A with B, (5) A with C, (6) B with C, and (7) A with B and with C. As used herein, the phrase "at least one of A or B" is intended to refer to implementations including any of (1) at least one A, (2) at least one B, and (3) at least one A and at least one B. Similarly, the phrase "at least one of A and B" is intended to refer to implementations including any of (1) at least one A, (2) at least one B, and (3) at least one A and at least one B. The term "and/or" when used, for example, in a form such as A, B, and/or C refers to an combination or subset of A, B, C such as (1) A alone, (2) B alone, (3) C alone, (4) A with B, (5) A with C, (6) B with C, and (7) A with B and with C.

As used herein, the expressions "in communication," "coupled" and "connected," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim and/or combinations thereof standing on its own as a separately claimed subject matter.

This patent covers all methods, apparatus and articles of manufacture fairly falling within the scope of the claims of this patent.

What is claimed is:

1. A system comprising:
   a transmitter including a first antenna array having a first spatial orientation, the transmitter configured to transmit a signal;
   a receiver including a second antenna array and an orientation sensor to determine a second spatial orientation of the second antenna array, the receiver configured to receive the signal; and
   a logic circuit configured to:
   compare the first spatial orientation to the second spatial orientation to determine a relative orientation of the second antenna array;
   determine an angle of arrival of the signal;
   identify, based on the relative orientation of the second antenna array and the angle of arrival of the signal, a received signal strength compensation value; and
   calculate a distance between the transmitter and the receiver based on a measured received signal strength of the signal and the identified compensation value.

2. The system of claim 1, wherein the logic circuit is external to the transmitter and the receiver.

3. The system of claim 1, wherein the receiver includes the logic circuit.

4. The system of claim 1, wherein the orientation sensor is three-dimensional sensor configured to determine a three-dimensional spatial orientation.

5. The system of claim 1, wherein the orientation sensor is an accelerometer.

6. The system of claim 1, wherein the received signal strength compensation value is stored in an orientation compensation profile comprising a plurality of orientation compensation values.

7. The system of claim 6, wherein the orientation compensation values are orientation-specific received signal strength indicator (RSSI) correction gains.

* * * * *